US006925557B2

(12) United States Patent
Cromer et al.

(10) Patent No.: US 6,925,557 B2
(45) Date of Patent: Aug. 2, 2005

(54) METHOD AND SYSTEM FOR A CLEAN SYSTEM BOOTING PROCESS

(75) Inventors: Daryl Carvis Cromer, Apex, NC (US); Joseph Wayne Freeman, Raleigh, NC (US); Steven Dale Goodman, Raleigh, NC (US); Eric Richard Kern, Durham, NC (US); Randall Scott Springfield, Chapel, NC (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 10/055,452

(22) Filed: Oct. 26, 2001

(65) Prior Publication Data

US 2003/0084278 A1 May 1, 2003

(51) Int. Cl.[7] .............................................. G06F 13/00
(52) U.S. Cl. .......................... 713/2; 713/100; 713/200; 710/16; 710/104
(58) Field of Search ...................... 710/16, 104; 713/2, 713/100, 200

(56) References Cited

U.S. PATENT DOCUMENTS

| 5,509,120 A | 4/1996 | Merkin et al. |
|---|---|---|
| 5,657,473 A | 8/1997 | Killean et al. |
| 5,758,170 A | 5/1998 | Woodward et al. |
| 5,805,882 A | 9/1998 | Cooper et al. |
| 5,809,230 A | 9/1998 | Pereira |
| 5,884,084 A | 3/1999 | Nelson et al. |
| 5,893,168 A | 4/1999 | Qureshi et al. |
| 5,960,084 A | 9/1999 | Angelo |
| 6,018,806 A | 1/2000 | Cortopassi et al. |
| 6,134,655 A | 10/2000 | Davis |
| 6,292,890 B1 * | 9/2001 | Crisan ........................... 713/2 |
| 6,317,828 B1 * | 11/2001 | Nunn ............................. 713/2 |
| 6,643,772 B1 * | 11/2003 | Aguilar et al. .................. 713/2 |
| 6,721,883 B1 * | 4/2004 | Khatri et al. ................... 713/2 |

OTHER PUBLICATIONS

IBM Technical Disclosure Bulletin; vol. 32, No. 10A, Mar. 1990; "Power–On Self–Test Extension Providing Remote Program Load Capability for Communication Cards"; R.P. Lloyd and K.M. Zyvoloski.
http://www.nondot.org–sabre/os/SIBooting/mbr.txt; "How it Works—Master Boot Record" Version 1a; Hale Landis.

* cited by examiner

Primary Examiner—Rehana Perveen
(74) Attorney, Agent, or Firm—Sawyer Law Group LLP

(57) ABSTRACT

A method, system and computer readable medium containing programming instructions for booting a computer system having a plurality of devices is disclosed. They include provisions for initiating a boot sequence in the computer system and determining whether a device of the plurality of devices is either a bootable device or a nonbootable device. If the device is a nonbootable device, a clean restart of the boot sequence is performed, wherein the nonbootable device is bypassed during the clean restart.

27 Claims, 7 Drawing Sheets

METHOD AND SYSTEM FOR A CLEAN SYSTEM BOOTING PROCESS

FIELD OF THE INVENTION

The present invention relates generally to computer systems and, more particularly, to a method and system for a clean boot process.

BACKGROUND OF THE INVENTION

With the advent of personal computer system use in every day personal and business affairs, the issue of computer security has become critical. To protect the information contained in the personal computer system, which in many cases may be highly sensitive and confidential, embedded security subsystems ("ESS") have been developed.

An ESS is typically a chip coupled to a processor in the computer. The ESS is independent from the computer's operating system, and therefore, is incorruptible from the operating system. The ESS is utilized generally according to the standards developed by the Trusted Computing Platform Alliance (TCPA), which is an open association of technology companies working to improve computer-platform security. The TCPA has developed an innovative trust model for computing platforms, including hardware capabilities, to make protections stronger.

FIG. 1 is a block diagram of a computer system 10 utilizing an ESS 40 in accordance with the TCPA trust model. As is shown, the computer system 10 includes a processor 20 coupled to a BIOS 30 and an ESS 40. The BIOS 30 typically performs a Power-on Self Test (POST) and ensures that hardware devices, such as a floppy drive 50 and hard drive 60, are functional. Memory 70 is coupled to the BIOS 30 to store code loaded from the hardware devices during POST. The BIOS 30 includes a boot block 32 and a main BIOS 34. The ESS 40 includes a plurality of protected control registers (PCRs) 42, at least one 42a of which is dedicated to the booting process.

In FIGS. 2A and 2B, a flowchart illustrating a conventional boot process 100 utilizing the ESS in accordance with the TCPA trust model is presented. The process 100 begins when the computer is reset in step 110, e.g., the computer is powered-up. In step 112, the PCR(s) 42a dedicated to the booting process is reset to zero. Before the code in the boot block 32 is executed, the code is hashed to produce a digest value, which is then extended to the PCR 42a, via step 114. Then, in step 116, the code in the boot block 32 is run, which passes control over to the main BIOS 34. Nevertheless, before executing the code in the main BIOS 34, that code is also hashed and the value extended to the PCR 42a in step 118. Then, in step 120, the code in the main BIOS 34 is run.

As with most typical boot processes, the BIOS 30 will perform a Power On Self Test (POST) for all of the different hardware components in the system to ensure each component is working properly. Thus, the BIOS 30 will determine which devices, e.g., floppy drive 50 and hard drive 60, are bootable, list them in a boot table, and then initiate the boot sequence.

Referring now to FIG. 2B, the process 100 continues at number B. Starting with a first device in the boot table, the BIOS 30 attempts to read the device (step 122) to determination whether the device is bootable (step 126). If the device is not bootable, then the boot table is incremented by one and the BIOS 30 attempts to read the next device (step 122). If the device appears to be bootable (step 126), then the BIOS 30 will hash code from the device and extend the value to the PCR 42a in step 126. The BIOS 30 will then load the code and execute this code in step 128). At this point, the code in the device is now in control of the system. The device will then make a determination of whether it is bootable in step 130. If the device code determines that it is not bootable, then it will return control back to the BIOS 30 by generating an interrupt signal, such as an interrupt 18h, via step 132. The BIOS 30 will increment to the next boot device in step 134. If, on the other hand, the device code determines that the device is bootable (step 130), the device will boot an operating system, via step 136.

Once the operating system has been booted, the process 100 continues at number C. This part of the process, illustrated in FIG. 2C, verifies the trustworthiness of the boot sequence. The value(s) in the PCR(s) 42a is a reflection of the boot process from beginning to end. In step 142, the value(s) in the PCR(s) 42a is compared to a predetermined value that reflects a trustworthy boot sequence. The predetermined value is typically calculated by the operating system.

If the PCR 42a value is not equal to the predetermined value calculated by the operating system (step 144), the operating system will be required to initiate a security check in step 148 to examine the boot process to determine whether a security breach has occurred. Additional logic must be provided in the operating system to perform this check.

If a device was determined by BIOS 30 to be bootable and the device ended up returning to BIOS 30 through the interrupt signal, then the PCR 42a value will differ from the predetermined value. Thus, while the boot process might be trustworthy, the operating system will nonetheless be required to initiate the security check. Moreover, because the code from a nonbootable device has been loaded from that device, there is a chance that destructive code from that device remains in system memory 70, where it can potentially cause harm.

Accordingly, a need exists for handling nonbootable devices identified during the boot process and for protecting the computer system without requiring additional logic in the operating system. The present invention addresses such a need.

SUMMARY OF THE INVENTION

A present invention provides a method, system and computer readable medium containing programming instructions for booting a computer system having a plurality of devices. The method, system and computer readable medium include initiating a boot sequence in the computer system and determining whether a device of the plurality of devices is either a bootable device or a nonbootable device. If the device is a nonbootable device, a clean restart of the boot sequence is performed, wherein the nonbootable device is bypassed during the clean restart.

Through the aspects of the present invention, if the BIOS is notified that a device is a nonbootable device, the BIOS will execute a clean restart of the entire boot process. The clean restart includes resetting the value in a PCR dedicated to the boot process to zero, and clearing system memory such that any code that might be stored from the nonbootable device is removed. During the clean restart, the BIOS will bypass the nonbootable device and proceed to attempt to boot other devices. Once the BIOS has booted to an operating system the value in the PCR should match a predetermined value known by the operating system because the BIOS will have performed a clean boot. If it does not, the operating system can conclude a nontrustworthy boot process, without the need for a security check and the associated logic therefor.

DETAILED DESCRIPTION

The present invention relates generally to computer systems and, more particularly, to a method and system for a clean boot process. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a clean and trustworthy boot process is performed by restarting the boot process whenever a device fails to boot, and bypassing that nonbootable device in the restarted boot process. By performing a clean restart and eventually booting only the boot device containing the operating system, the operating system need not be concerned with checking the trustworthiness of the nonbootable devices, thereby saving time and resources. In addition, during a clean restart, any code loaded and stored in memory from the nonbootable device is cleared, thereby eliminating a potential source of intrusion.

Figure 1:
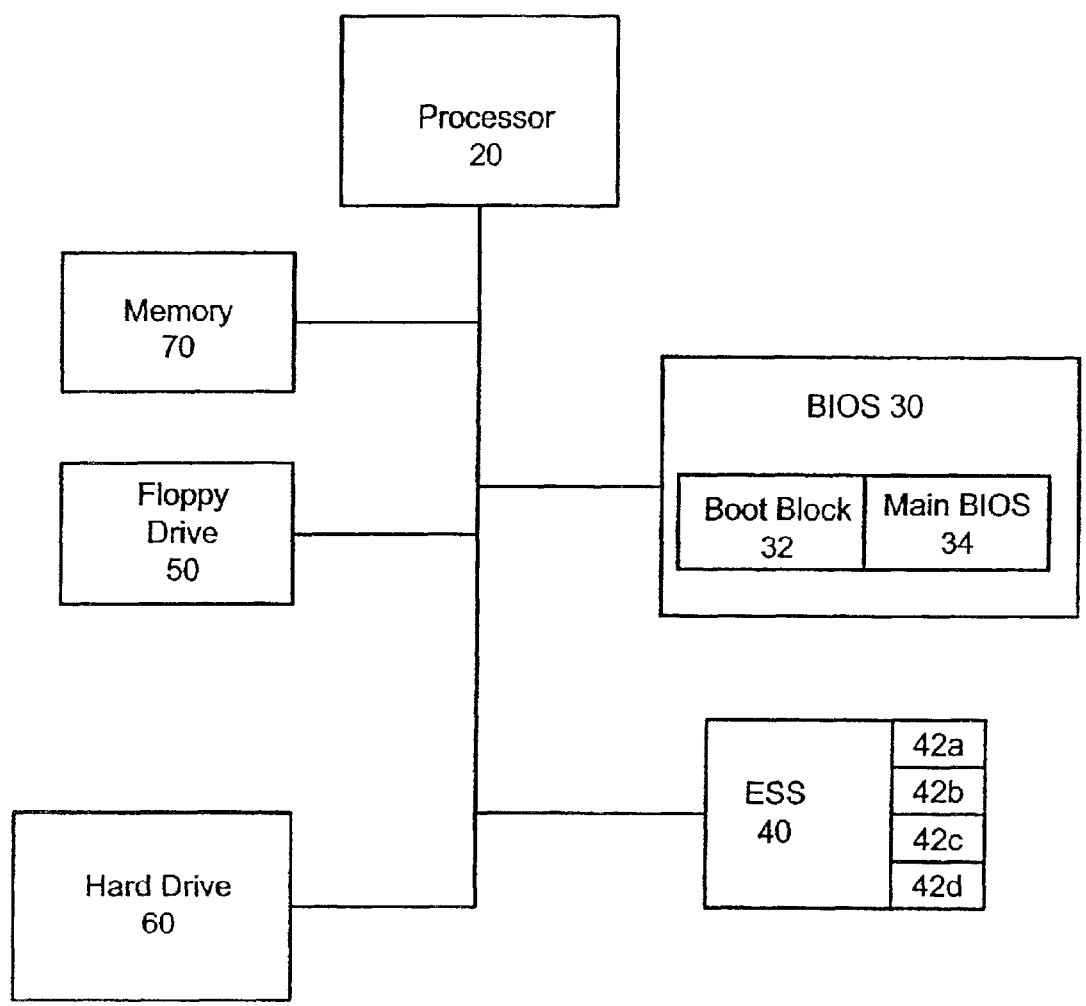
FIG. 1 illustrates a block diagram of a computer system that can be used in accordance with the preferred embodiment of the present invention.
Figure 2A:
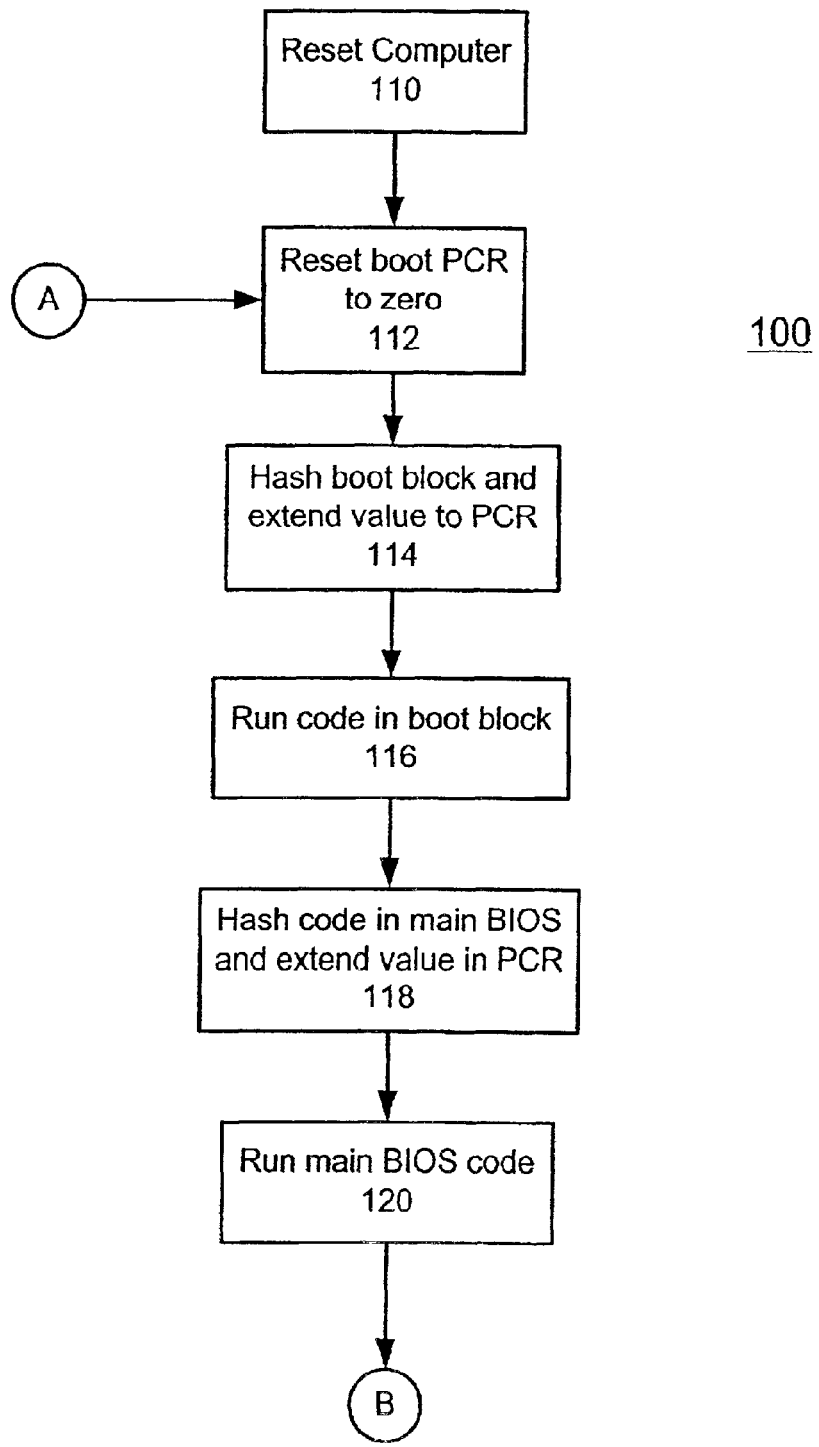
FIGS. 2A, 2B and 2C illustrate a flowchart of a process for booting a computer system utilizing an ESS in accordance with a TCPA trusted model.
Figure 2B:
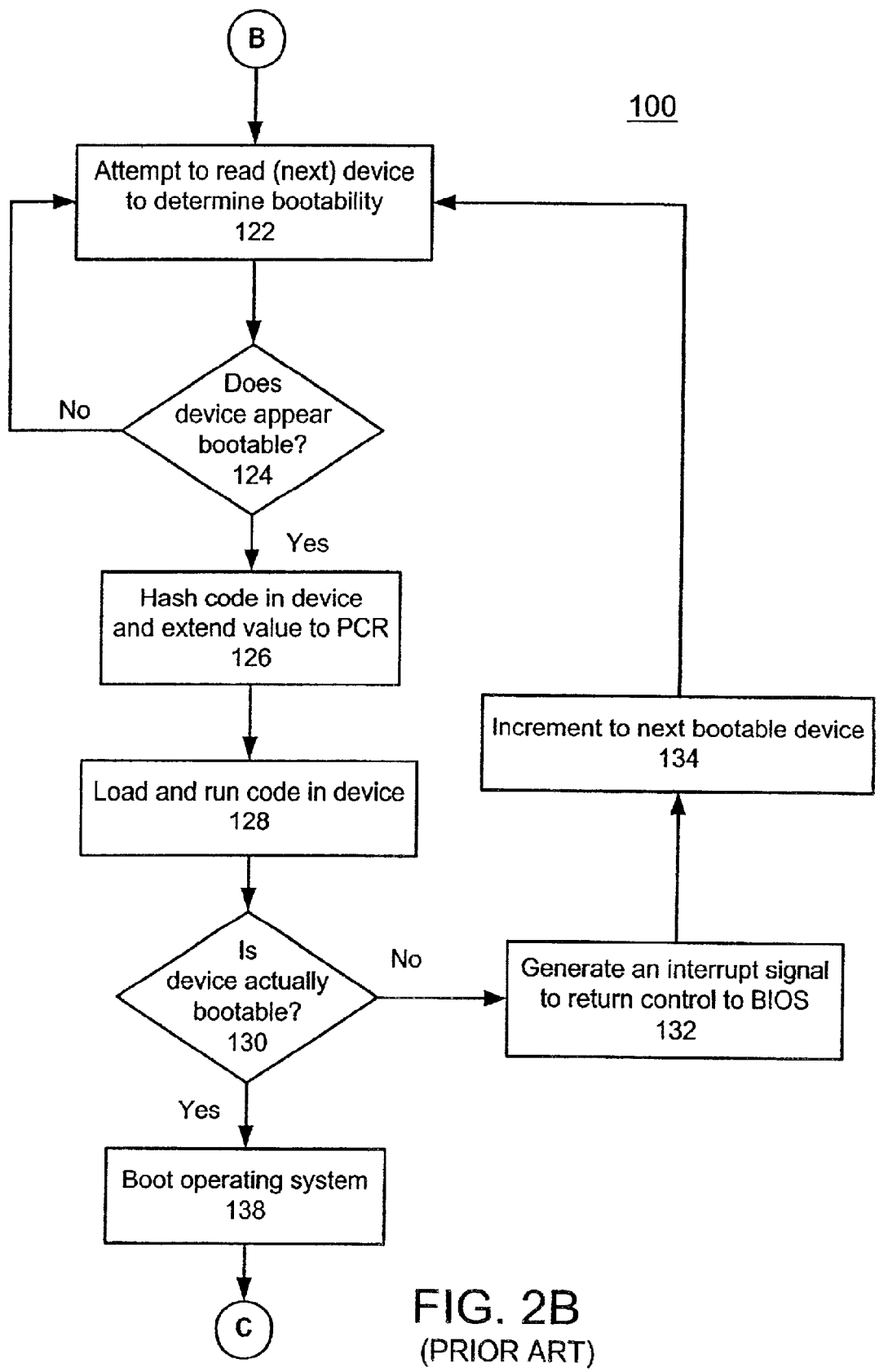
Figure 2C:
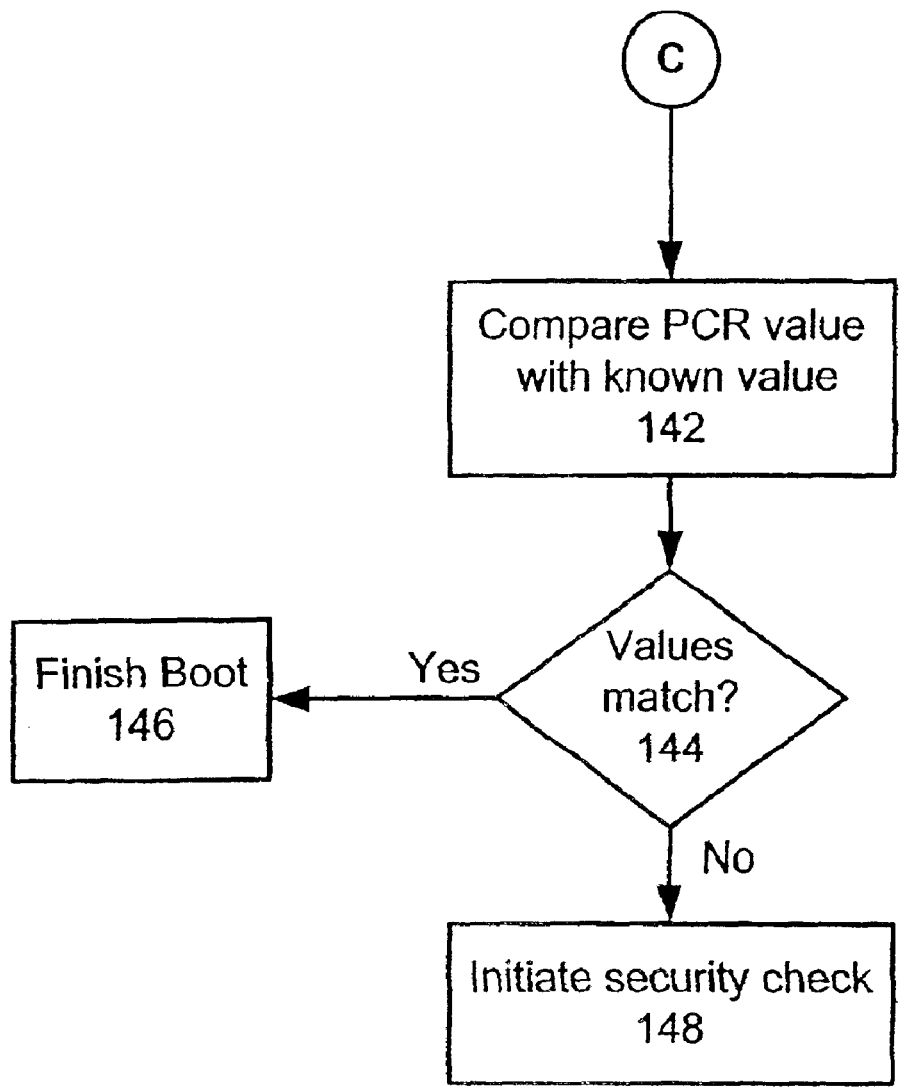
Figure 3A:
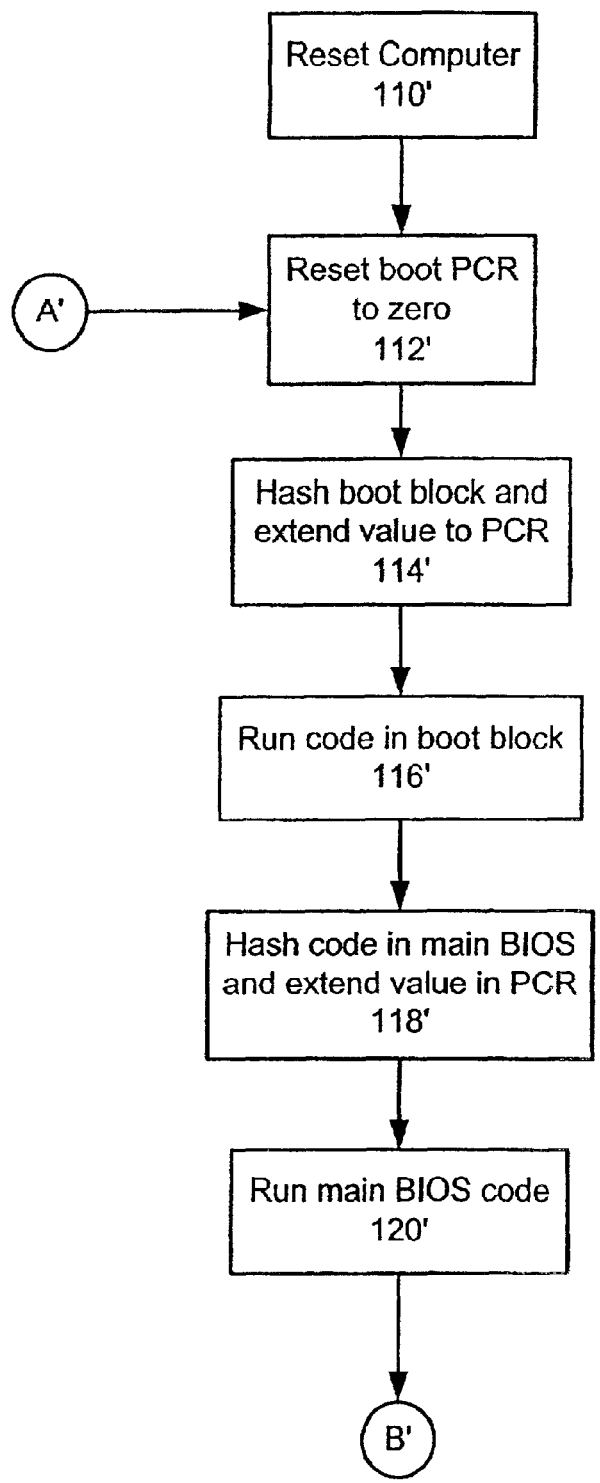
FIGS. 3A, 3B and 3C illustrate a flowchart of a process for booting the system in accordance with a preferred embodiment of the present invention.
Figure 3B:
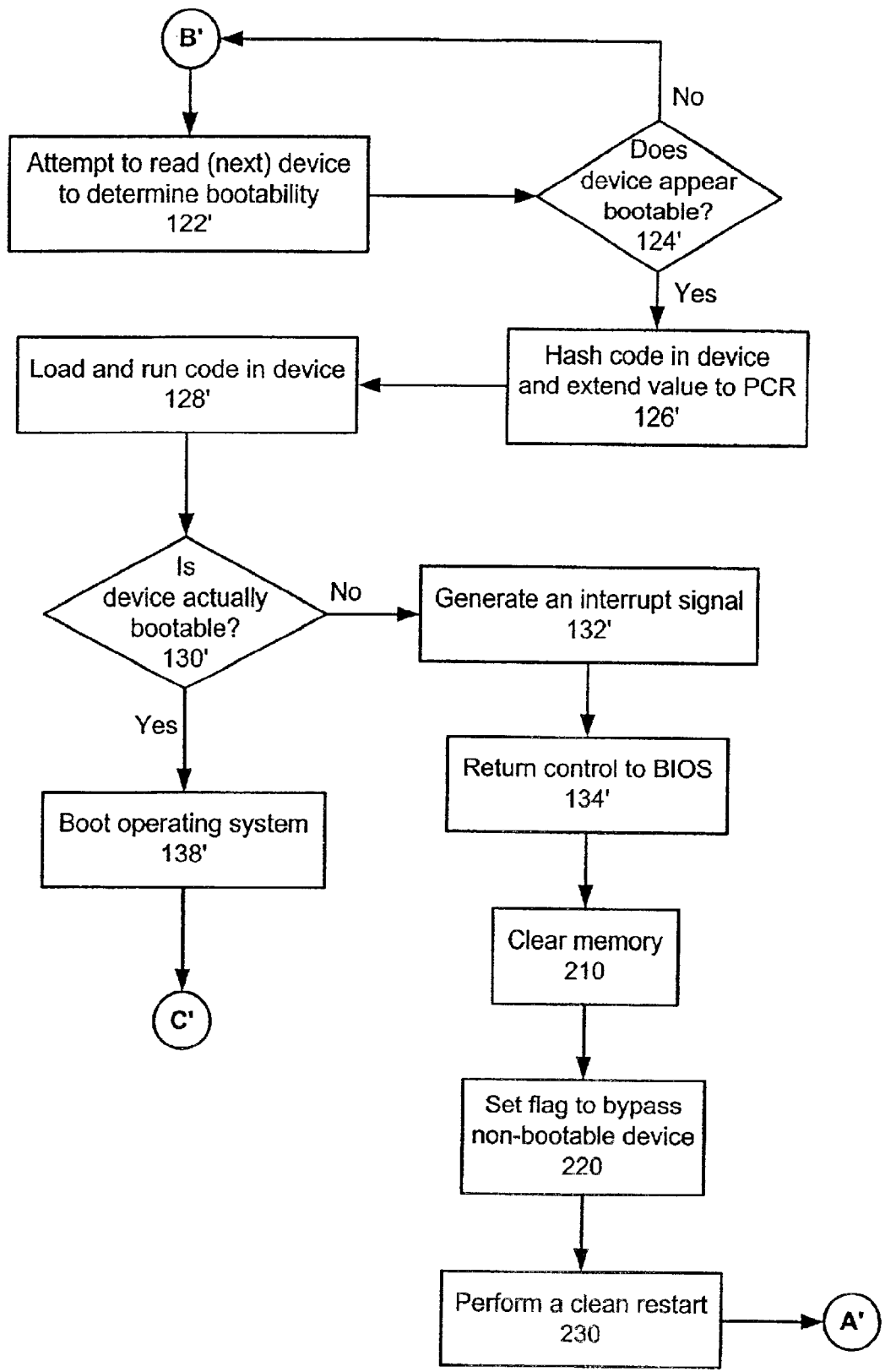
Figure 3C:
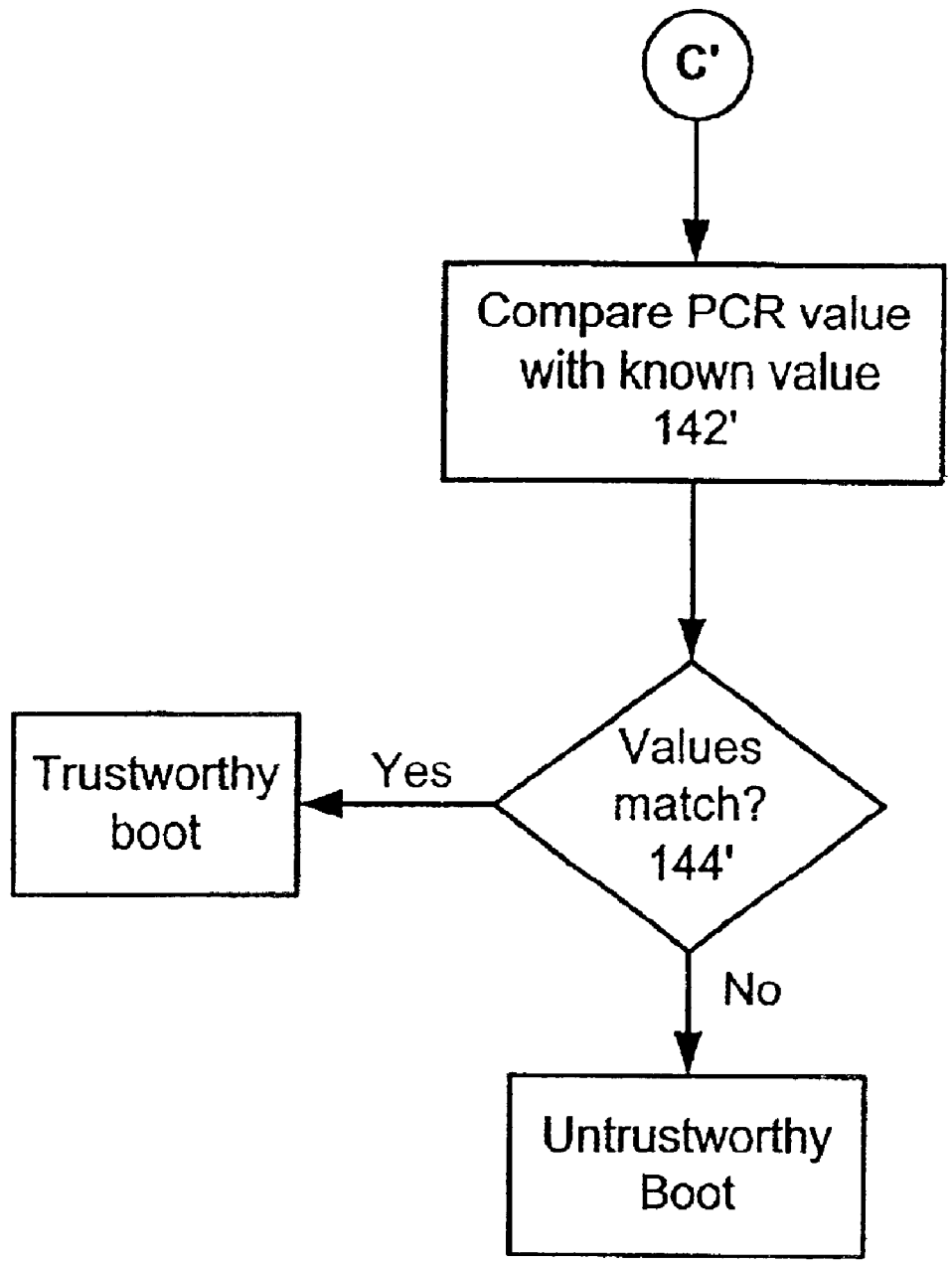

FIGS. 3A, 3B and 3C illustrate a process in accordance with a preferred embodiment of the present invention. Referring first to FIG. 3A, the process begins as before, e.g., with a computer reset (step 110'), resetting a value in a PCR 42a dedicated to the boot process to zero in step 112,' hashing code in the boot block 32 and extending the value to the PCR 42a (step 114'), running the code in the boot block 32 to pass control to the main BIOS 34 (step 116'), hashing code in the main BIOS 34 and extending the value to the PCR 42a (step 118'), and running the code in the main BIOS 34 in step 120.'

Referring now to FIG. 3B, as before, the BIOS attempts to boot the next boot device. If the device does not appear to be bootable (step 124'), then step 122' is repeated whereby the BIOS 30 attempts to boot the next device in the boot table. If the device appears bootable, then the BIOS 30 will hash code from the device and extend the value to the boot PCR 42a in step 126'. The BIOS 30 will then load the code from the device and execute this code in step 128'. The operating system code loaded by the BIOS 30 then makes another determination as to whether the device is actually bootable in step 130'. If, the code is not bootable, then the operating system code will generate an interrupt signal, such as an interrupt 18h, via step 132'. The interrupt signal will return control back to the BIOS 30 in step 134'. The BIOS 30 will then clear any code loaded into memory 70 (step 210), and set a flag indicating that the current device should be bypassed on a next boot, via step 220. The BIOS 30 will then force a clean restart of the system in step 230. At this point, steps 112' to 130' are repeated. During the clean restart, the BIOS 30 bypasses booting any device that has been flagged, and instead increments to the next bootable device in the boot table. Thus, steps 122' to 130' are performed on the next bootable device.

Once the boot device has been booted, i.e., an operating system has been booted via step 138', then the trustworthiness of the boot process is verified. Referring now to FIG. 3C, the value in the PCR 42a is compared to the predetermined value that represents a trustworthy boot process. Preferably, the predetermined value is calculated by the operating system, which is aware of the bootable devices. Because the method and system in accordance with the preferred embodiment of the present invention performs the clean restart whenever the BIOS 30 unsuccessfully attempts to boot a nonbootable device, the PCR 42a value reflects only the device that was successfully booted by BIOS 30. Thus, by comparing the PCR 42a value and the predetermined value, the operating system can immediately determine whether the boot is trustworthy.

For example, if unauthorized code is present in any one of those successfully booted devices, the digest value resulting from a hash of that code will produce a PCR 42a value that differs from the predetermined value. The operating system would then conclude that the boot process is not trustworthy, and take appropriate action. If, however, the PCR 42a value matches the predetermined value, then the operating system can be assured that the boot process is trustworthy, and full control can be passed to the operating system.

Through the method and system of the present invention, a clean boot process is performed before verifying the trustworthiness of the boot process. Because the boot process is clean the operating system does not need to include additional logic to perform a security check of the nonbootable and bootable devices to determine if a breach has occurred. By performing a clean restart, which includes clearing the memory, any code loaded and stored in memory from the nonbootable device is cleared, thereby eliminating a potential source of intrusion. Thus, the method and system of the present invention protects the computer system from rogue applications that may be hidden in the hardware devices.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for booting a computer system, wherein the computer system includes a plurality of devices, the method comprising the steps of:

(a) initiating a boot sequence in the computer system, wherein the computer system further includes a BIOS and an embedded security system coupled to the BIOS, wherein the embedded security system includes at least one protected control register dedicated to the boot sequence, and wherein the initiating step (a) further includes:

(a1) resetting a value in the at least one protected control register to zero;

(a2) hashing code in the BIOS to produce a BIOS digest value;

(a3) extending the BIOS digest value to the at least one protected control register; and (a4) executing the code in the BIOS; and (b) determining whether a first device of the plurality of devices is one of a bootable device and a nonbootable device; and (c) performing a clean restart of the boot sequence if the device is a nonbootable device, wherein the nonbootable device is bypassed during the clean restart.

2. The method of claim 1, wherein the determining step (b) further includes:

(b1) hashing code in the first device to produce a device digest value;

(b2) extending the device digest value to the at least one protected control register;

(b3) executing the code in the first device; and (b4) generating an interrupt signal if the first device is a nonbootable device.

3. The method of claim 2, wherein the computer system includes memory for storing the code loaded from the plurality of devices during the boot sequence, and wherein the step of performing a clean restart (c) further includes the steps of:

(c1) clearing the memory;

(c2) flagging the nonbootable device to instruct the BIOS to bypass the nonbootable device during the clean restart; and (c3) repeating steps (a) and (b).

4. The method of claim 3 further including the steps of:

(d) booting the first device if the device is bootable, thereby booting an operating system.

5. The method of claim 4 further including the step of:

(e) verifying the trustworthiness of the boot sequence.

6. The method of claim 5, wherein the verifying step (e) further includes:

(e1) providing a predetermined value that represents a trustworthy boot sequence; and (e2) comparing the value of the at least one protected control register with the predetermined value.

7. The method of claim 1, wherein the BIOS includes a boot block and a main BIOS, and wherein the hashing step (a2) further includes:

(a2i) hashing code in the boot block to produce a boot block digest value;

(a2ii) extending the boot block digest value to the at least one protected control register;

(a2iii) executing the code in the boot block to transfer control to the main BIOS; and (a2iv) hashing code in the main BIOS to produce a main BIOS digest value.

8. The method of claim 2, wherein the generating step (b4) further includes executing an INT 18*h*.

9. The method of claim 1, wherein the computer system includes a trusted computing platform in accordance with the standards defined by the Trusted Computing Platform Alliance (TCPA).

10. A system for booting a computer system, wherein the computer system includes a plurality of a devices, the system comprising:

a processor in the computer system;

a BIOS coupled to the processor for initiating and executing a boot sequence in the computer system;

wherein the BIOS determines whether a first device of the plurality of devices is one of a bootable device and a nonbootable device, and performs a clean restart of the boot sequence if the first device is a nonbootable device, bypassing the nonbootable device during the clean restart; and an embedded security system coupled to the BIOS, wherein the embedded security system includes at least one protected control register dedicated to the boot sequence, wherein a value in the at least one protected control register is reset to zero at initiation of the boot sequence, and wherein prior to executing code in the BIOS, the BIOS code is hashed to produce a BIOS digest value, which is extended to the at least one protected control register.

11. The system of claim 10, wherein the BIOS determines whether the first device is a nonbootable device by hashing code in the first device to produce a device digest value, extending the device digest value to the at least one protected control register, executing the code in the first device, and generating an interrupt signal if the first device is a nonbootable device.

12. The system of claim 11 further including memory coupled to the processor for storing code loaded from the plurality of devices during the boot sequence, and wherein if the interrupt signal is generated, the BIOS performs the clean restart by clearing the memory, resetting the value in the at least one protected control register to zero, and initiating a new boot sequence, bypassing the nonbootable device.

13. The system of claim 12, wherein if the first device is bootable, the BIOS boots an operating system.

14. The system of claim 13, wherein the processor verifies the trustworthiness of the boot sequence.

15. The system of claim 14, wherein the processor is provided with a predetermined value that represents a trustworthy boot sequence, and the processor compares the value of the at least one protected control register with the predetermined value.

16. The system of claim 10, wherein the BIOS includes a boot block and a main BIOS and wherein code in the boot block is hashed and extended to the at least one protected control register before the boot block code is executed to transfer control to the main BIOS, and wherein code in the main BIOS is hashed and extended to the at least one protected control register before the main BIOS code is executed.

17. The system of claim 11, wherein the interrupt signal is an INT 18*h*.

18. The system of claim 10 further including a trusted computing platform in accordance with the standards defined by the Trusted Computing Platform Alliance (TCPA).

19. A computer readable medium containing programming instructions for booting a computer system, wherein the computer system includes a plurality of a devices, the programming instructions for:

(a) initiating a boot sequence in the computer system, wherein the computer system further includes a BIOS and an embedded security system coupled to the BIOS, wherein the embedded security system includes at least one protected control register dedicated to the boot sequence, and wherein the initiating instruction (a) further includes instructions for:

(a1) resetting a value in the at least one protected control register to zero;

(a2) hashing code in the BIOS to produce a BIOS digest value;

(a3) extending the BIOS digest value to the at least one protected control register; and (a4) executing the code in the BIOS; and (b) determining whether a first device of the plurality of devices is one of a bootable device and a nonbootable device; and (c) performing a clean restart of the boot sequence if the first device is a nonbootable device, wherein the nonbootable device is bypassed during the clean restart.

20. The computer readable medium of claim 19, wherein the determining instruction (b) further includes instructions for:

(b1) hashing code in the first device to produce a device digest value;

(b2) extending the device digest value to the at least one protected control register;

(b3) executing the code in the device; and (b4) generating an interrupt signal if the first device is a nonbootable device.

21. The computer readable medium of claim 20, wherein the computer system includes memory for storing the code loaded from the plurality of devices during the boot sequence, and wherein the instruction for performing a clean restart (c) further includes the instructions for:

(c1) clearing the memory;

(c2) flagging the nonbootable device to instruct the BIOS to bypass the nonbootable device during the clean restart; and (c3) repeating instructions (a) and (b).

22. The computer readable medium of claim 21 further including the instructions for:

(d) booting the first device if the device is bootable, thereby booting an operating system.

23. The computer readable medium of claim 22 further including the instructions for:

(e) verifying the trustworthiness of the boot sequence.

24. The computer readable medium of claim 23, wherein the verifying instruction (e) further includes instructions for:

(e1) providing a predetermined value that represents a trustworthy boot sequence; and (e2) comparing the value of the at least one protected control register with the predetermined value.

25. The computer readable medium of claim 19, wherein the BIOS includes a boot block and a main BIOS, and wherein the hashing instruction (a2) further includes instructions for:

(a2i) hashing code in the boot block to produce a boot block digest value;

(a2ii) extending the boot block digest value to the at least one protected control register;

(a2iii) executing the code in the boot block to transfer control to the main BIOS; and (a2iv) hashing code in the main BIOS to produce a main BIOS digest value.

26. The computer readable medium of claim 20, wherein the generating instruction (b4) further includes the instruction for running an INT 18*h*.

27. The computer readable medium of claim 19, wherein the computer system includes a trusted computing platform in accordance with the standards defined by the Trusted Computing Platform Alliance (TCPA).

* * * * *